(12) United States Patent
Usui et al.

(10) Patent No.: US 7,641,564 B2
(45) Date of Patent: Jan. 5, 2010

(54) MEMBER WITH INNER TEETH AND METHOD OF PRODUCING THE SAME

(75) Inventors: Yoshimi Usui, Tochigi-ken (JP); Junichi Suto, Utsunomiya (JP); Minoru Sugiyama, Shimotsuke (JP); Hidetoshi Isogai, Mooka (JP); Munenori Tate, Mooka (JP); Toshio Takaku, Tochigi-ken (JP); Takashi Ichimura, Mooka (JP); Toshio Izawa, Mooka (JP)

(73) Assignee: Honda Motor Co., Ltd., Tokyo (JP)

( * ) Notice: Subject to any disclaimer, the term of this patent is extended or adjusted under 35 U.S.C. 154(b) by 287 days.

(21) Appl. No.: 11/663,742

(22) PCT Filed: Nov. 16, 2005

(86) PCT No.: PCT/JP2005/021060

§ 371 (c)(1),
(2), (4) Date: Mar. 26, 2007

(87) PCT Pub. No.: WO2006/054614

PCT Pub. Date: May 26, 2006

(65) Prior Publication Data
US 2008/0090665 A1    Apr. 17, 2008

(30) Foreign Application Priority Data
Nov. 16, 2004    (JP)    ............................. 2004-331556

(51) Int. Cl.
*F16D 1/06* (2006.01)
(52) U.S. Cl. ........................ 464/182; 148/220; 464/906
(58) Field of Classification Search ......... 464/140–146, 464/906, 182; 148/220; 403/359.1–359.6
See application file for complete search history.

(56) References Cited

U.S. PATENT DOCUMENTS

| 3,934,429 | A | * | 1/1976 | Takahashi et al. ........... 464/146 |
| 4,119,443 | A | * | 10/1978 | Abe et al. |
| 5,178,688 | A | * | 1/1993 | Yu et al. |
| 6,120,382 | A |   | 9/2000 | Sone et al. |

(Continued)

FOREIGN PATENT DOCUMENTS

JP    60-103123 A    6/1985

(Continued)

*Primary Examiner*—Greg Binda
(74) *Attorney, Agent, or Firm*—Birch, Stewart, Kolasch & Birch, LLP

(57) ABSTRACT

Grooves as ball rolling grooves are formed in a side peripheral wall of a preparatory formed body that is to be an inner member. A recess opened so as to be continuous to curved bottom sections of the grooves, which face a through-hole, is formed in one end surface of the preparatory formed body. In carburizing, carburizing gas entering into space between the through-hole and a support shaft member flows through the recess after coming into contact with inner teeth, and is then discharged to the outside of the preparatory formed body via the curved bottom sections of the grooves. On the contrary, the carburizing gas having been in contact with the curved bottom sections of the grooves flows through the recess to come to be in contact with the inner teeth and is then discharged through the space.

9 Claims, 9 Drawing Sheets

U.S. PATENT DOCUMENTS

| | | | |
|---|---|---|---|
| 6,126,897 A | * | 10/2000 | Aihara et al. |
| 6,390,924 B1 | * | 5/2002 | Yoshida et al. |
| 2002/0173363 A1 | * | 11/2002 | Makino et al. |
| 2003/0051771 A1 | * | 3/2003 | Nishimori et al. |

FOREIGN PATENT DOCUMENTS

| | | |
|---|---|---|
| JP | 2-298249 A | 12/1990 |
| JP | 4-263060 A | 9/1992 |
| JP | 5-215144 A | 8/1993 |
| JP | 6-2102 A | 1/1994 |
| JP | 9-177810 A | 7/1997 |
| JP | 9-324257 A | 12/1997 |
| JP | 2002-371320 A | 12/2002 |
| JP | 2003-193138 A | 7/2003 |

* cited by examiner

FIG. 7

| Run No. | CP VALUE | | | |
|---|---|---|---|---|
| | SCM STEEL | | BORON STEEL | |
| | WITHOUT RECESS | WITH RECESS | WITHOUT RECESS | WITH RECESS |
| 1 | 1.18 | 1.90 | 1.05 | 1.67 |
| 2 | 1.10 | 1.95 | 1.04 | 1.67 |
| 3 | | | 0.98 | 2.11 |
| 4 | | | 1.10 | 1.52 |

FIG. 9

| STACKED POSITION | HARDENING STRAIN DIFFERENCE (mm) | |
|---|---|---|
| | SCM STEEL | BORON STEEL |
| 1 (UPPERMOST POSITION) | −11.3 | −44.4 |
| 2 | −5.1 | −28.0 |
| 3 (MIDDLE POSITION) | −4.6 | −30.4 |
| 4 | −3.8 | −27.5 |
| 5 (LOWERMOST POSITION) | −12.3 | −40.3 |

MEMBER WITH INNER TEETH AND METHOD OF PRODUCING THE SAME

TECHNICAL FIELD

The present invention relates to an internal spline-possessing member (internal spline-possesing member) in which an internal spline is provided on an inner circumferential wall of a through-hole and a carburizing treatment is applied to the internal spline, and a method for producing the same.

BACKGROUND ART

When a member made of metal is subjected to a hardening treatment, the carburizing treatment, in which carbon is diffused into the surface layer portion to provide a hardened layer at the surface layer portion, has been hitherto widely carried out. For example, in the case of an inner member for constructing a Birfield type constant velocity universal joint, the carburizing treatment is applied to an internal spline formed on an inner circumferential wall of a through-hole.

When the carburizing treatment is applied to such an inner member, it is necessary to avoid forming a hardened layer having an excess thickness on the internal spline, for the following reason. That is, the toughness is lowered, and thus the crack tends to appear, because the hardness of the internal spline is unnecessarily increased.

Japanese Laid-Open Patent Publication No. 2-298249 proposes application of an anti-carburization agent to an internal spline, and Japanese Laid-Open Patent Publication No. 6-2102 proposes to apply an anti-carburization treatment such as nickel plating. Japanese Laid-Open Patent Publication Nos. 4-263060 and 60-103123 disclose that an internal spline is surrounded by a seal or a spacer in order to regulate the degree of formation of the hardened layer.

When the carburization-preventive agent is used, it is necessary that the carburization-preventive agent is exfoliated and removed from the inner member after applying the carburizing treatment, which is complicated. Further, it is impossible to adjust the depth of the hardened layer.

When the seal or the spacer is used, it is necessary for the operator to manually install the seal, the spacer or the like. Therefore, it is time consuming, and hence the production efficiency is lowered.

The present applicant has proposed in Japanese Laid-Open Patent Publication No. 9-324257 that a support shaft member, which is composed of, for example, a pipe standing on a frame, is inserted into through-holes of a plurality of inner members so that the plurality of inner members are successively stacked. While maintaining a constant annular gap between the inner circumferential surfaces of the inner members and the outer circumferential surface of the support shaft member, the carburizing gas is supplied to the gap. Accordingly, the depth of the hardened layer formed on the inner circumferential surface of the inner member is substantially uniform. Further, the hardened layer formed on the inner circumferential surface is shallower than the hardened layer formed on the outer circumferential surface.

In this procedure, the end surfaces of the inner members are stacked while making close contact with each other. Therefore, the carburizing agent (gas) does not leak or leaks very little from the space between the inner members adjoining vertically. Accordingly, the carburizing agent contacts only the exposed surfaces of the stacked inner members, i.e., the two portions of the lower end surface of the lowermost inner member disposed just above the frame and the upper end surface of the inner member stacked at the uppermost position. Therefore, it is not easy to apply the carburizing treatment to the respective end surfaces of all of the stacked inner members.

Further, the hardened layer is formed on only one end surface of each of the inner members disposed at the lowermost and uppermost positions as described above. This sometimes causes the relatively large difference in the hardening strain in each of the inner members disposed at the lowermost and uppermost positions as shown in FIG. 9. In such a situation, it is difficult to maintain the dimensional accuracy of the inner member as well as that of the internal spline. In particular, when the inner member is made of high strength steel, for example, boron steel in which the crystal grain boundary is reinforced by elemental addition, a large hardening strain difference causes, because the structure sensitivity of the high strength steel is higher than that of a general case hardening steel such as SCM steel (see FIG. 9). SCM steel is an alloy steel for machine structural use which is defined by the Japanese Industrial Standards. The numerical values shown in FIG. 9 represent the results obtained on condition that the number of stacked inner members is five. In the column of the "stacked position," "1", indicates the inner member disposed at the uppermost position, "3" indicates the inner member disposed at the middle position, and "5" indicates the inner member disposed at the lowermost position. "2" and "4" indicate the inner members interposed between "1" and "3" and between "3" and "5," respectively. The hardening strain difference is dimensional difference before and after the hardening treatment at the identical portion of each of the inner members. Each inner member is measured at a position corresponding to measured positions in other inner members.

DISCLOSURE OF THE INVENTION

Problems to be Solved by the Invention

A general object of the present invention is to provide an internal spline-possessing member in which the carburizing treatment is applied to an internal spline and both end surfaces.

A principal object of the present invention is to provide an internal spline-possessing member in which hardening strain difference is avoided as thoroughly as possible.

Another object of the present invention is to provide a method for producing the internal spline-possessing member as described above.

According to an embodiment of the present invention, there is provided an internal spline-possessing member including a through-hole which has an internal spline formed on an inner circumferential wall, and a plurality of grooves which are provided on an outer side circumferential wall so that the grooves form projections therebetween, the internal spline-possessing member comprising:

a recess provided on at least one end surface of both end surfaces at which the through-hole is open so that a gas is capable of flowing from the through-hole to all of the grooves, wherein a carburizing treatment is applied to the internal spline, the recess, and a portion on the other end surface at the position symmetrical with respect to the recess.

That is, the carburizing treatment is applied to the substantially entire surface of the internal spline-possessing member, and the hardened layer is provided thereby. Therefore, hardening strain difference is suppressed, and dimensional accuracy is consequently secured. Accordingly, the production yield of the internal spline-possessing member is improved as well.

Preferred examples of the internal spline-possessing member include an inner member of a constant velocity universal joint. In this arrangement, torque-transmitting balls are rollably inserted into the grooves together with grooves formed on an outer member of the constant velocity universal joint.

Preferred examples of the material for the internal spline-possessing member include boron steel. That is, the internal spline-possessing member according to the present invention may be composed of the material with which it is difficult to secure the dimensional accuracy due to relatively large hardening strain difference.

According to another embodiment of the present invention, there is provided a method for producing an internal spline-possessing member by applying a carburizing treatment to a formed product including a through-hole which has an internal spline formed on an inner circumferential wall, and a plurality of grooves which are provided on an outer side circumferential wall so that the grooves form projections therebetween to produce the internal spline-possessing member, the method comprising the steps of:

manufacturing the formed product having a recess provided on at least one end surface of both end surfaces at which the through-hole is open so that a gas is capable of flowing between the through-hole and all of the grooves through the recess;

stacking the formed products by inserting a shaft member standing on a base pedestal through the through-holes of the plurality of formed products so that the end surfaces, at which the recesses are provided, face to the same direction; and heating the stacked formed products in a heat treating furnace while a carburizing agent is supplied into the heat treating furnace, the carburizing agent passes through the grooves or the through-holes of the formed products, and is then discharged from the through-holes or the grooves, wherein a carburizing treatment is applied to the internal spline and the recess of one formed product, and the end surface of another formed product adjacent thereto by passing the carburizing agent through the recess via the grooves or the through-hole.

As described above, when the recess is provided for the internal spline-possessing member so that gas or liquid is capable of flowing in the direction from the inner circumferential wall side to the outer circumferential wall side of the internal spline-possessing member or in the direction opposite to the above, the gas flows from the internal spline (inner circumferential wall) via the recess to the outside or from the outside via the recess to the internal spline during the carburizing treatment. Therefore, the carburizing treatment is applied to the wall surface of the recess and the end surface of another formed product positioned just below or just above the recess. Further, the carburizing gas also contacts the exposed surface of the internal spline-possessing member. Consequently, the internal spline-possessing member, in which the carburizing treatment is applied to the substantially entire surface, is obtained.

In other words, the carburizing treatment can be applied to the internal spline and the both end surfaces of the internal spline-possessing member, and the hardened layer can be consequently formed thereon. Accordingly, hardening strain difference is avoided. Therefore, the internal spline-possessing member, which has the satisfactory dimensional accuracy, is obtained.

It is preferable that the plurality of formed products are immersed in a cooling medium in a stacked state after completing the carburizing treatment, to make the cooling medium flow to the grooves or the through-holes via the recesses from the through-holes or the grooves. Accordingly, the hardening treatment can be applied at once to the areas of the plurality of formed products in which the carburizing treatment has been applied. That is, the efficiency of the hardening treatment is improved.

Preferred examples of the internal spline-possessing member include an inner member of a constant velocity universal joint as described above.

BRIEF DESCRIPTION OF THE DRAWINGS

FIG. 7 is a table showing the relationship between a CP value and presence or absence of a recess;

FIG. 9 is a table showing the relationship between a stacked position and hardening strain difference.

BEST MODE FOR CARRYING OUT THE INVENTION

The internal spline-possessing member and the method for producing the same according to the present invention will be exemplified by preferred embodiments below, which will be explained in detail with reference to the accompanying drawings.

Figure 1:
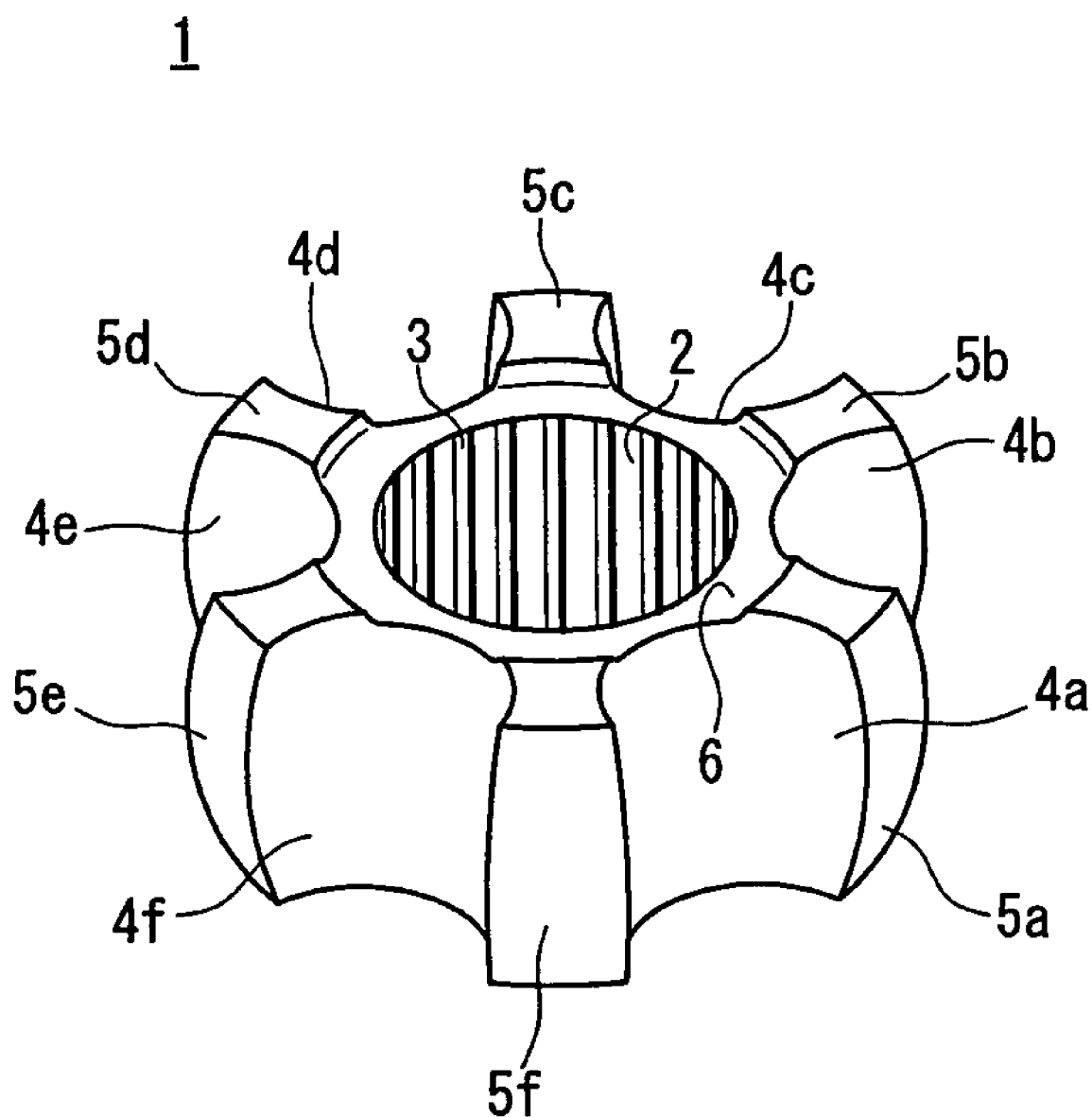
FIG. 1 is a schematic perspective view illustrating an entire inner member as an internal spline-possessing member according to an embodiment of the present invention.

FIG. 1 shows a schematic perspective view illustrating an entire inner member (internal spline-possessing member) 1 according to an embodiment of the present invention for constructing a constant velocity universal joint of the Birfield type. In this embodiment, the inner member 1 is composed of boron steel. A through-hole 2 is provided through a substantially central portion of the inner member 1 in the axial direction. An internal spline 3 is formed on the inner circumferential wall of the through-hole 2. Teeth of an unillustrated drive shaft are meshed with the internal spline 3.

Six grooves 4a to 4f are provided on the side circumferential wall of the inner member 1. The six grooves 4a to 4f extend in the axial direction of the through-hole 2, and they are separated from each other at equal intervals. The bottoms of the grooves 4a to 4f are greatly curved toward the through-hole 2. The inner member 1 has such a shape that six projections 5a to 5f are provided between the grooves 4a to 4f.

Unillustrated torque-transmitting balls, which constitute the tripod type constant velocity universal joint, are rollably inserted into the grooves 4a to 4f. That is, the grooves 4a to 4f function as ball-rolling grooves.

A substantially circular recess 6 is provided on the upper end surface of the inner member 1 as shown in FIG. 1. The recess 6 is concentric with the through-hole 2. Parts of the outer circumferential edge of the recess 6 are cut out by the curved bottoms of the grooves 4a to 4f. In other words, the diameter of the recess 6 is set so that the recess 6 is continued to the curved bottoms of the grooves 4a to 4f. The recess 6 functions as the flow passage for the gas or the liquid from the through-hole 2 to the grooves 4a to 4f as described later on.

It is necessary that the outer diameter of the recess 6 is in such an extent that the recess 6 is continued to at least the curved bottoms of the grooves 4a to 4f. However, if the outer diameter of the recess 6 is excessively large, then there is such a possibility that the degree of the hardening strain difference of the inner member 1 may differ between the inner circumferential wall (internal spline 3) and the side circumferential wall (projections 5a to 5f), and the torque-transmitting balls to be inserted into the grooves 4a to 4f are likely to be disengaged from the grooves 4a to 4f. Further, the recess 6 may be shielded by the end surface of another preformed product positioned just above or just below the recess 6, and no carburizing treatment is not likely to be applied to the wall surface forming the recess 6, when the preformed products of the inner members 1 are stacked during the carburizing treatment as described later on.

Therefore, the outer diameter of the recess 6 is set to be in the following extent at the maximum. That is, the degree of the hardening strain of the inner member 1 is approximately equivalent between the internal spline 3 and the projections 5a to 5f, the torque-transmitting balls are not disengaged from the grooves 4a to 4f, and one end of another preformed product, which faces the recess 6, does not enter the recess 6.

The depth of the recess 6 is set to be in such an extent that the carburizing gas and the cooling agent reliably flows to the grooves 4a to 4f, and the strength of the inner member 1 is not lowered.

The hardened layer is formed by applying the carburizing treatment to the inner member 1 at least on the respective wall surfaces of the recess 6 and on the portion which corresponds to the recess 6 on the end surface other than the end provided with the recess 6.

Figure 2:
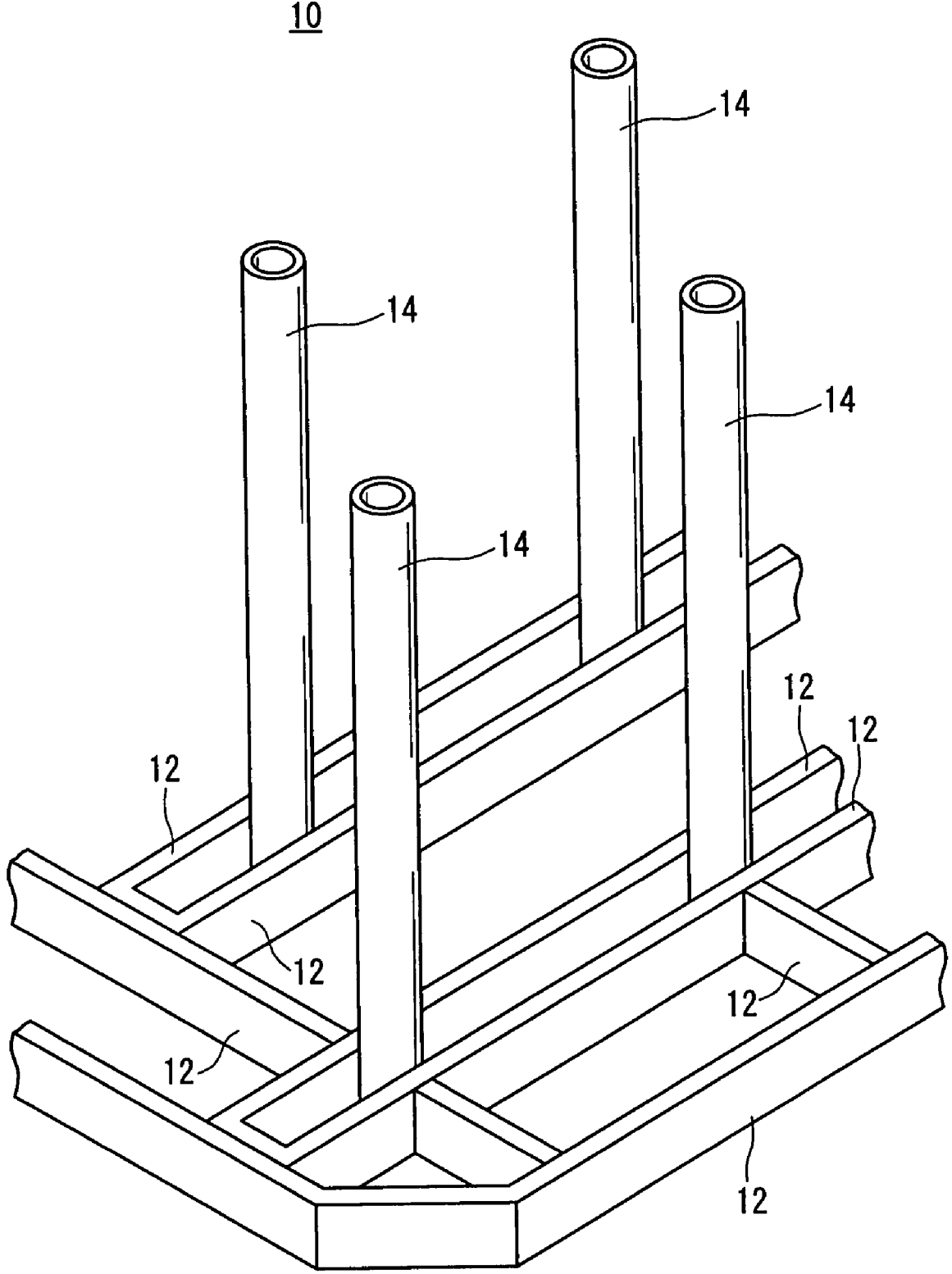
FIG. 2 is a partially omitted perspective view showing a retaining mechanism for carrying out a method for producing the internal spline-possessing member according to an embodiment of the present invention.

The inner member 1 is manufactured as follows by using a workpiece-retaining mechanism 10 shown in FIG. 2 after the preformed product 8 (see FIG. 3), which has the shape corresponding to the shape of the inner member 1 made of boron steel, is processed, for example, by a cool forging process.

The workpiece-retaining mechanism (hereinafter simply referred to as "retaining mechanism") 10 has a plurality of frames (base pedestals) 12 which are provided and aligned substantially in parallel to one another, and a plurality of support shaft members (shaft members) 14 which are separated from each other by predetermined space in the longitudinal direction of the frames 12. The support shaft member 14 is composed of a pipe through which a through-hole is formed in the axial direction, which is secured to a pair of adjoining frames 12 by, for example, welding.

Figure 3:
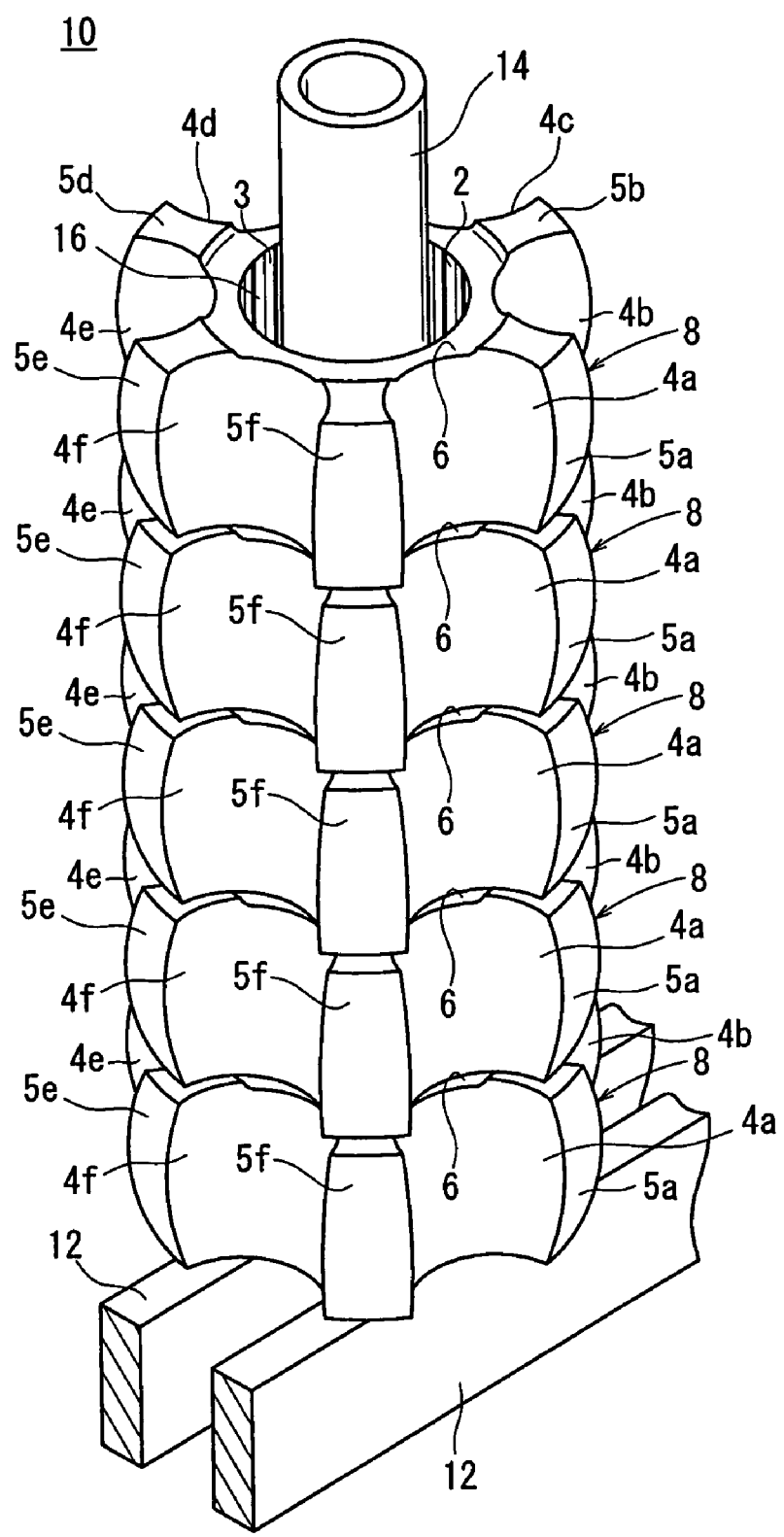
FIG. 3 is a perspective view illustrating a state in which a plurality of preformed products are stacked by using the retaining mechanism shown in FIG. 2.
Figure 4:
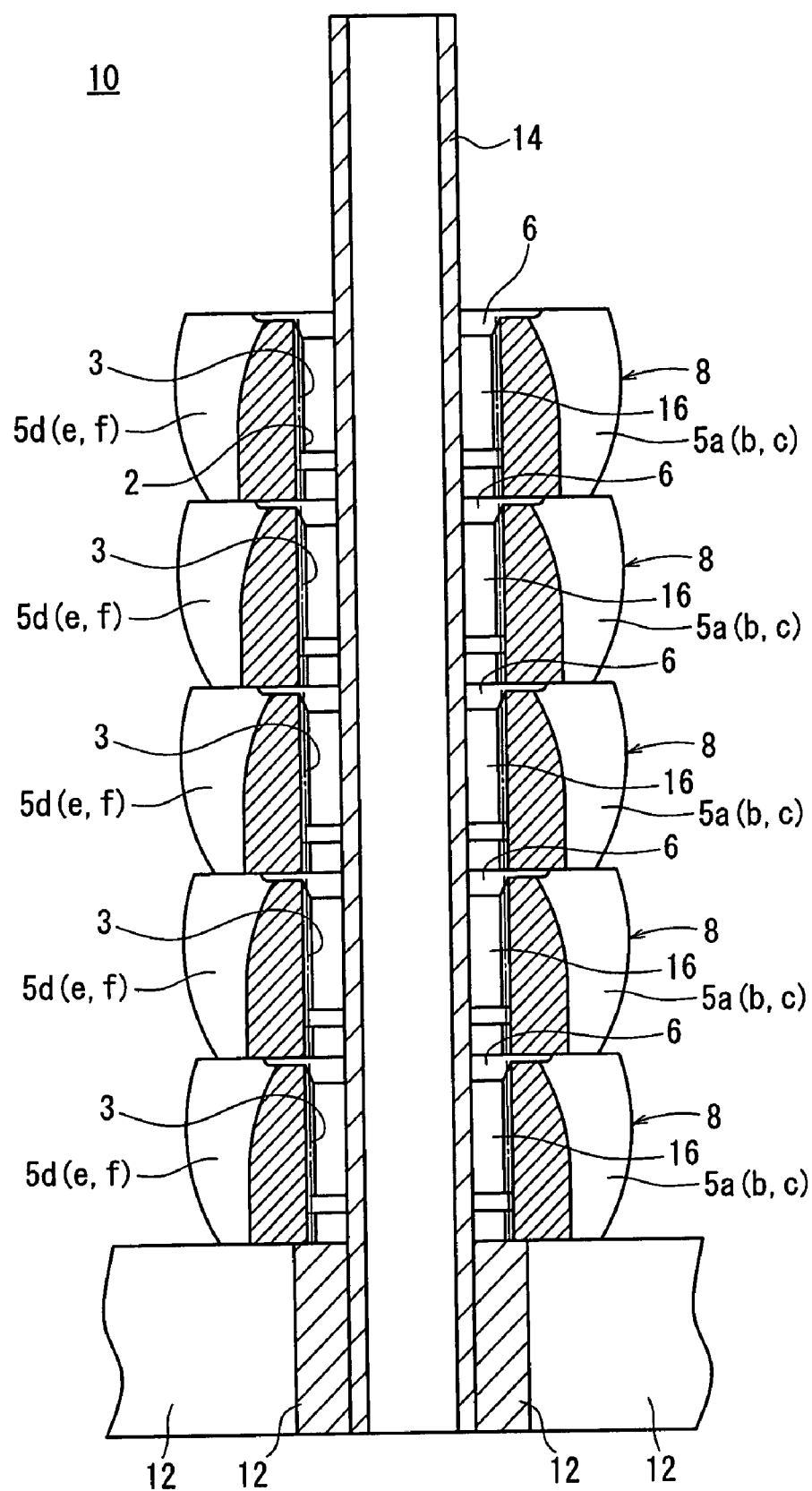
FIG. 4 is a vertical sectional view illustrating the state shown in FIG. 3.

In this arrangement, as shown in FIGS. 3 and 4, five of the preformed products 8 are retained by the support shaft member 14. The internal spline 3, which is formed on the inner wall surface of the through-hole 2 of each of the preformed products 8, is separated from the side circumferential wall of the support shaft member 14 by a predetermined space. In other words, the gap 16 is formed between the internal spline 3 and the support shaft member 14.

The shape of the preformed product 8 is the same as that of the inner member 1. Therefore, the same components of the preformed product 8 as those of the inner member 1 are designated by the same reference numerals, and detailed explanation thereof will be omitted. The carburizing treatment is not applied to the preformed product 8. Therefore, the hardened layer is not formed on the preformed product 8.

Figure 5:
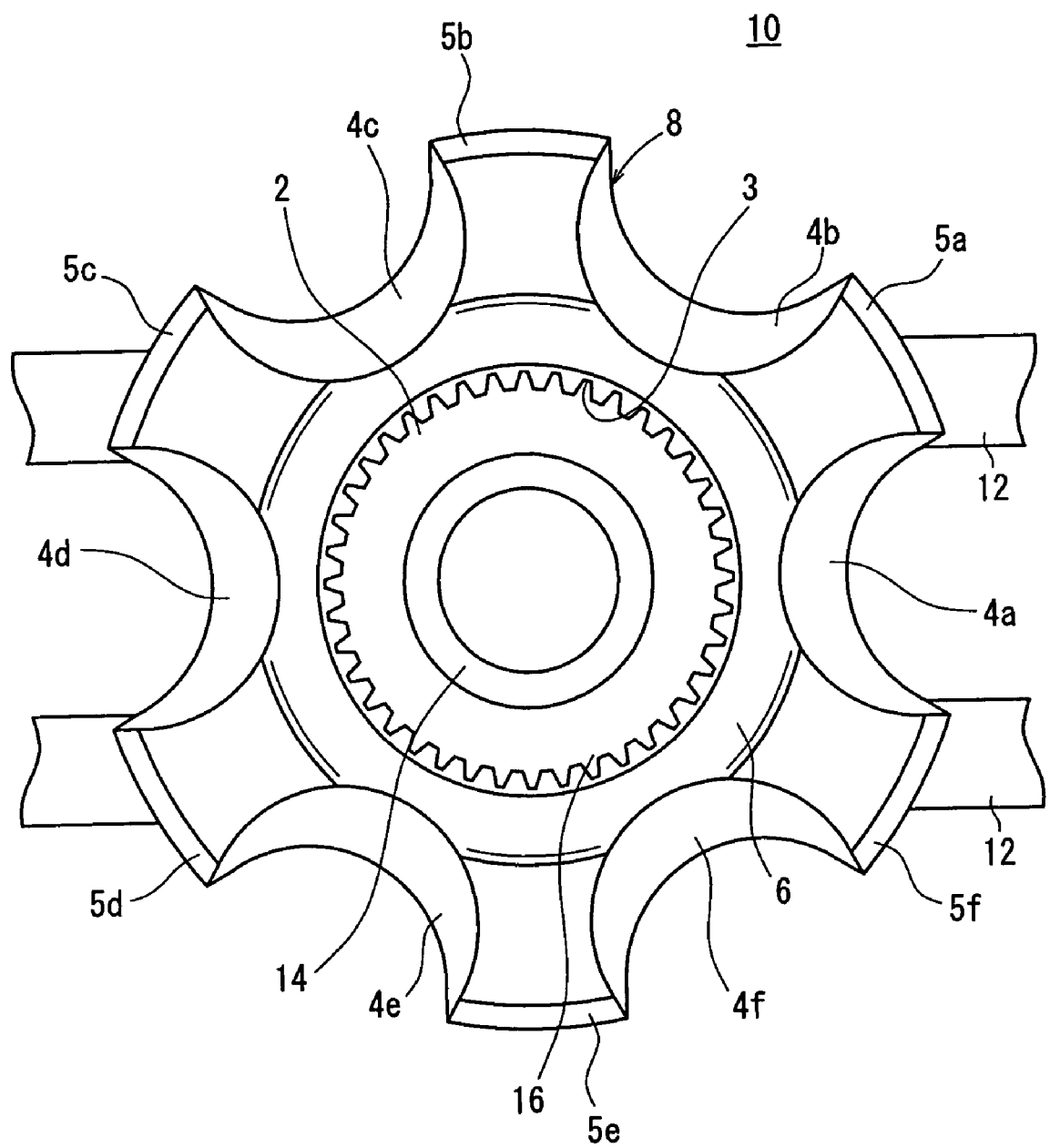
FIG. 5 is a plan view illustrating the state shown in FIG. 3.

In this embodiment, the respective preformed products 8 are retained by the support shaft member 14 such that the end surfaces, on which the recesses 6 are provided, face upward, and the positions of the respective projections 5a to 5f are coincident with each other. That is, for example, the end surface of another preformed product 8, which is disposed on the side provided with no recess 6, is positioned just above the recess 6 of the preformed product 8. As described above, the diameter of the recess 6 is set in such an extent that one end of the preformed product 8 facing the recess 6 does not enter the recess 6. That is, the wall surface of the recess 6 is not shielded by one end surface of the preformed product 8 disposed thereabove. Therefore, as shown in FIGS. 3 to 5, the flow passage formed in each of the preformed products 8 makes it possible to flow gas or liquid from the gap 16 to the respective grooves 4a to 4f or from the respective grooves 4a to 4f to the gap 16.

The retaining mechanism 10 is put into the chamber of the unillustrated heat treating furnace to be subjected to the carburizing treatment while maintaining thus formed the flow passages. Specifically, at first, when the temperature of the heat treating furnace reaches a predetermined temperature, the gas (for example, methane gas or propane gas), which serves as the carburizing agent, is supplied.

The carbon components, which is the constitutive element of the carburizing gas surrounding the preformed products 8 from the outside, enter and diffuse to the exposed portions of the preformed products 8, i.e., for example, the surface layer portions of the projections 5a to 5f, the grooves 4a to 4f. As a result, the hardened layer having a predetermined depth is formed in the surface layer.

The carburizing gas, which has contacted with the grooves 4a to 4f, flows to the gap 16 via the recesses 6 of the preformed products 8, and then contacts the respective internal spline 3 while moving downwardly or upwardly. The carburizing gas is finally discharged from the lower portion or the upper portion of the gap 16. That is, the carburizing gas contacts the bottom surface of the recess 6, one end surface of another preformed product 8 positioned just above the recess 6, and the internal spline 3.

On the other hand, the carburizing gas enters the gap 16 from below or above to arrive at the internal spline 3 of the preformed product 8. The carburizing gas passes through the recess 6, and is then discharged outside of the preformed product 8 from the vicinity of the bottoms of the grooves 4a to 4f provided with the opening of the recess 6. Therefore, the carburizing gas contacts the internal spline 3, the wall surface of the recess 6, and one end surface of another preformed product 8 positioned just above the recess 6.

When the carburizing gas contacts the respective portions of the preformed product 8 as described above, the carbon components enter and diffuse to the surface layer of the contact portions. That is, the hardened layer is also formed on the internal spline 3, the wall surface of the recess 6, and the portion of another preformed product 8 disposed at the symmetrical position with respect to the recess 6. As a result, the inner member 1 having the hardened layer is obtained.

That is, according to this embodiment, the carburizing treatment is applied not only to the projections 5a to 5f and the grooves 4a to 4f of the preformed product 8 but also to the both end surfaces thereof to form the hardened layer. In other words, the hardened layer is provided on the substantially entire surface of the preformed product 8. Therefore, it is possible to suppress hardening strain difference on the preformed product 8, and consequently on the inner member 1 as the final product.

After the above procedures, the gas discharge step is performed to discharge the carburizing gas from the chamber of the heat treating furnace, the soaking step is performed to retain the temperature in the heat treating furnace at a substantially constant hardening retaining temperature, and then the cooling step is performed to cool the inner members 1 to a predetermined temperature.

Figure 6:
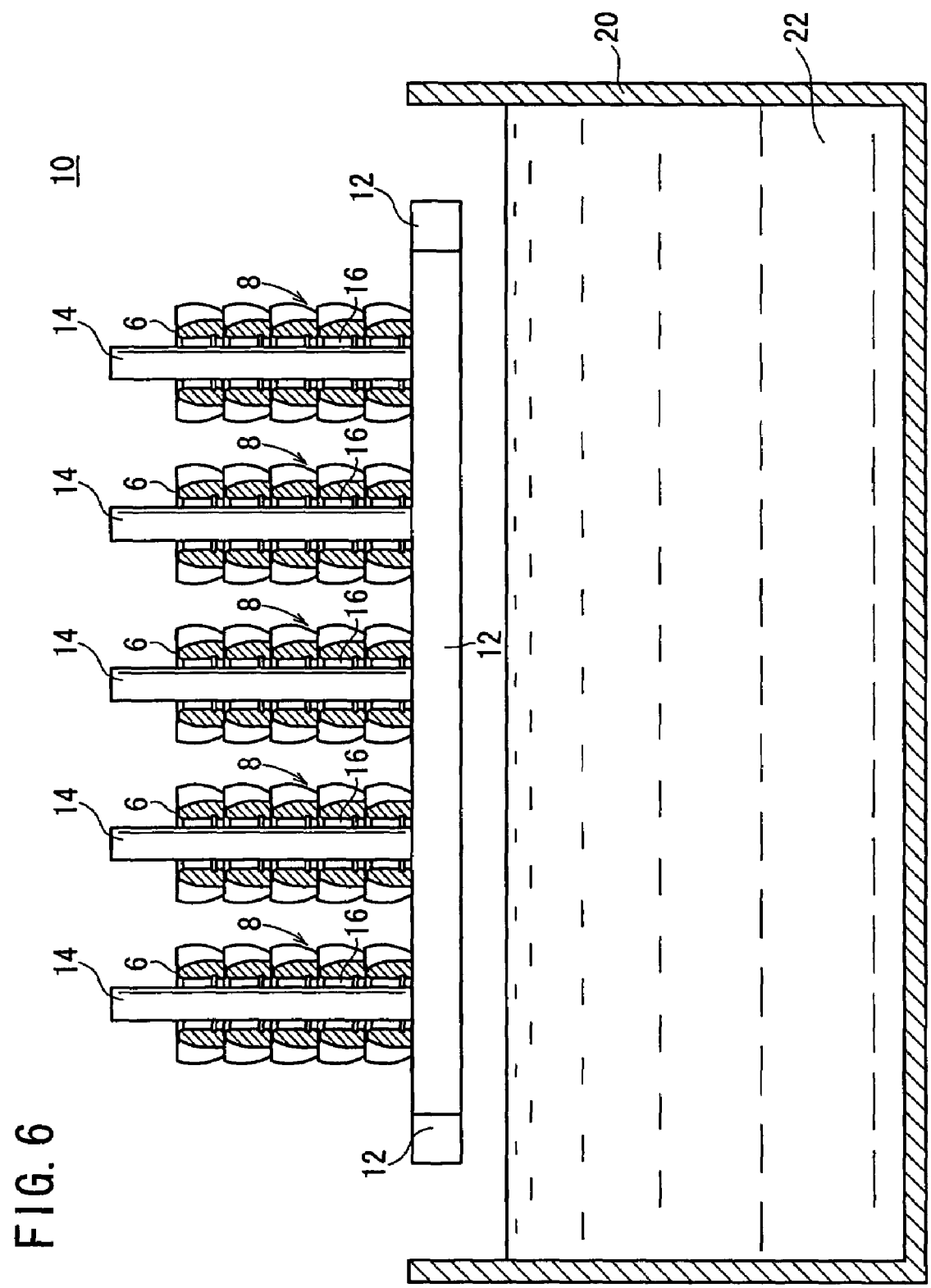
FIG. 6 is a schematic view showing a state where heated inner races are to be cooled in an oil bath while retained by the retaining mechanism.

The inner members 1, which are taken out from the chamber of the heat treating furnace, are delivered by an unillustrated conveying apparatus while inserting the support shaft member 14 therethrough. As shown in FIG. 6, the inner members 1 are finally immersed together with the retaining mechanism 10 in the cooling oil (cooling medium) 22 stored in an oil bath 20.

When the inner members 1 are left for a predetermined period of time in the cooling oil 22, then the exposed projections 5a to 5f and the grooves 4a to 4f of the inner members 1 make contact with the cooling oil 22 contained in the oil bath 20 to be appropriately cooled thereby. On the other hand, the cooling oil 22 flows through the internal spline 3, the recess 6, and the portion symmetrical with respect to the recess 6, along the same route as the carburizing gas flows. In other words, the portion is cooled by contacting the cooling oil 22 flowing from the gap 16 via the recess 6 and discharged in the vicinity of the curved bottoms of the grooves 4a to 4f, or with the cooling oil 22 flowing from the vicinity of the curved bottoms of the grooves 4a to 4f and being discharged at the gap 16 via the recess 6.

As the temperature of the inner member 1 is lowered to a predetermined temperature as described above, the inner member 1 is subjected to a hardening treatment. Because the cooling oil 22 from the gap 16 or the vicinity of the curved bottoms of the grooves 4a to 4f flows as described above, the internal spline 3, the wall surface of the recess 6, and the portion symmetrical with respect to the recess 6 in the flow route are subjected to a uniform hardening treatment.

After the entire inner members 1 are cooled to the predetermined temperature as described above, the inner members 1 are pulled out of the oil bath 20 together with the retaining mechanism 10 by the unillustrated conveying apparatus. The hardening treatment is thus completed.

According to the operation as described above, the hardening strain difference is suppressed. Thus, the inner member 1 having satisfactory dimensional accuracy is obtained.

FIG. 7 shows the relationship between the presence or absence of the recess 6 and the process capability parameter (CP value) when the carburizing treatment and the hardening treatment are applied to thirty preformed products 8 composed of SCM steel and boron steel. The larger the CP value is, the smaller the number of defective products is.

According to FIG. 7, it is clear that the number of defective products is extremely decreased, in other words, the inner member 1 excellent in dimensional accuracy with small hardening strain difference is obtained by providing the recess 6 for applying the carburizing treatment to boron steel which is likely to cause hardening strain difference as well as the SCM steel.

As described above, in this embodiment, the recess 6 extending to the grooves 4a to 4f is defined in the preformed product 8, and the carburizing gas or the cooling oil flows to the outer circumferential wall via the recess 6 after contacting the internal spline 3 during the carburizing treatment and the hardening treatment. Accordingly, the hardened layer is also provided on the internal spline 3 and the both end surfaces of the inner member 1. Therefore, the inner member 1 is prevented from hardening strain difference. As a result, the production yield of the inner member 1 is improved.

The above embodiment has been explained the case in which the preformed product 8 is subjected to the carburizing treatment to obtain the inner member 1 for constructing the tripod type constant velocity universal joint. However, the present invention is not specifically limited thereto. The present invention is applicable to a member having an internal spline.

The number of the preformed products 8 into which the support shaft member 14 is inserted is not specifically limited. The number may be less or more than 5.

The present invention is particularly preferable when the internal spline-possessing member is composed of the material with which it is difficult to secure dimensional accuracy due to its relatively large hardening strain difference. However, the material of the internal spline-possessing member is not limited thereto, and any material may be usable. Examples of other materials include case hardening steel.

The preformed products 8 may be stacked with each other such that the end surfaces, on which the recesses 6 are provided, face downward. Alternatively, the recesses 6 may be provided on the both end surfaces of the preformed product 8.

Figure 8:
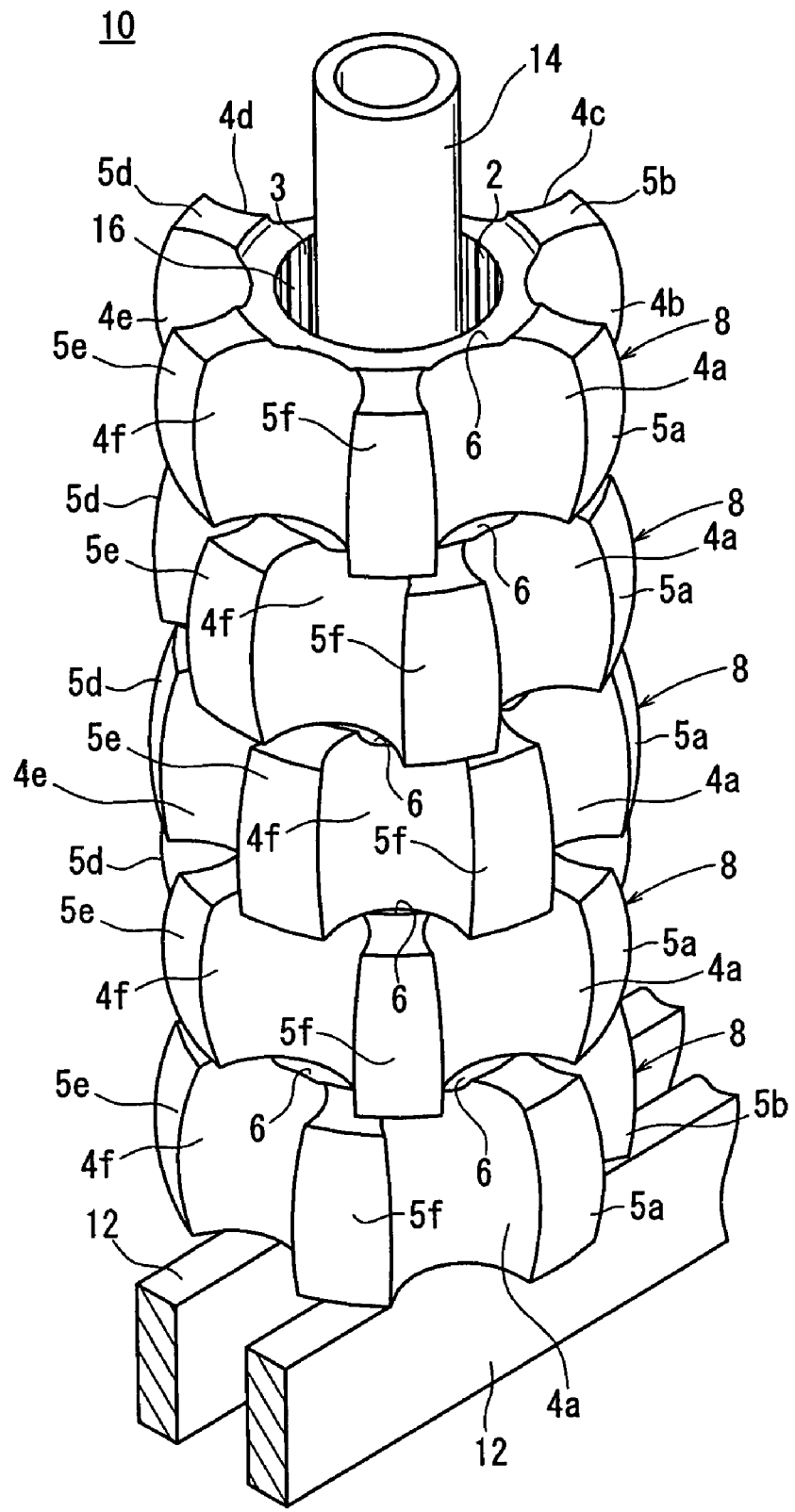
FIG. 8 is a perspective view illustrating a state in which a plurality of preformed products are irregularly stacked by the retaining mechanism shown in FIG. 2.

When the preformed products 8 are stacked together, the positions of the projections 5a to 5f are not necessarily aligned, but irregularly stacked, as shown in FIG. 8. In this case, the recess 6 is not closed by one end surface of the preformed product 8 disposed just above the recess 6. Therefore, the carburizing gas from the grooves 4a to 4f to the internal spline 3 or from the internal spline 3 to the grooves 4a to 4f is not blocked. Consequently, the carburizing treatment is applied to the respective preformed products 8.

The invention claimed is:

1. An internal spline-possessing member including a through-hole which has an internal spline formed on an inner circumferential wall comprising:
    a recess provided on at least one end surface of both end surfaces at which said through-hole is open so that a gas is capable of flowing from said through-hole through said recess to a side circumferential wall, wherein
    a carburizing treatment is applied to said internal spline, said recess, and a portion on the other end surface at the position symmetrical with respect to said recess.

2. The internal spline-possessing member according to claim 1, wherein a plurality of grooves are provided on said side circumferential wall so that said grooves form projections therebetween.

3. The internal spline-possessing member according to claim 2, wherein said internal spline-possessing member is an inner member of a constant velocity universal joint, and torque-transmitting balls are rollably inserted into said grooves together with grooves formed on an outer member of said constant velocity universal joint.

4. The internal spline-possessing member according to claim 1, wherein said internal spline-possessing member is composed of boron steel.

5. A method for producing an internal spline-possessing member by applying a carburizing treatment to a formed product including a through-hole which has an internal spline formed on an inner circumferential wall comprising the steps of:
    manufacturing said formed product having a recess provided on at least one end surface of both end surfaces at which said through-hole is open so that a gas is capable of flowing between said through-hole and a side circumferential wall through said recess;

stacking said formed products by inserting a shaft member standing on a base pedestal through said through-holes of said plurality of formed products so that said end surfaces, at which said recesses are provided, face the same direction; and heating said stacked formed products in a heat treating furnace, while a carburizing agent is supplied into said heat treating furnace, and said supplied carburizing agent passes through said recesses from said side circumferential wall or said through-holes of said formed products through said recesses, and then is discharged from said through-holes or said side circumferential wall, wherein said carburizing treatment is applied to said internal spline and said recess of one formed product, and said end surface of another formed product adjacent thereto by passing said carburizing agent through said recess via said side circumferential wall or said through-hole.

6. The method for producing said internal spline-possessing member according to claim 5, wherein said plurality of formed products are immersed in a cooling medium in a stacked state after completing said carburizing treatment, to make said cooling medium flow to said circumferential wall or said through-holes via said recesses from said through-holes or said circumferential wall.

7. The method for producing said internal spline-possessing member according to claim 5, wherein said formed product including a plurality of grooves which are provided on said side circumferential wall so that said grooves form projections therebetween is produced as said internal spline-possessing member.

8. The method for producing said internal spline-possessing member according to claim 7, wherein an inner member of a constant velocity universal joint is manufactured as said internal spline-possessing member.

9. The method for producing said internal spline-possessing member according to claim 5, wherein said internal spline-possessing member is composed of boron steel.

* * * * *